(12) United States Patent
Wu et al.

(10) Patent No.: US 10,135,971 B2
(45) Date of Patent: *Nov. 20, 2018

(54) CONGESTION DETECTION AND DYNAMIC THROTTLING OF AUTOMATED TELEPHONE CALL ATTEMPTS DURING MASS CALL EVENTS

(71) Applicant: AtHoc, Inc., San Mateo, CA (US)

(72) Inventors: Xi Sigmund Wu, San Carlos, CA (US); Himanshu Makkar, San Jose, CA (US); Yousong Xiao, Fremont, CA (US)

(73) Assignee: AtHoc, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/790,920

(22) Filed: Oct. 23, 2017

(65) Prior Publication Data

US 2018/0146087 A1 May 24, 2018

Related U.S. Application Data

(63) Continuation of application No. 15/356,838, filed on Nov. 21, 2016, now Pat. No. 9,800,722.

(51) Int. Cl.
*H04M 7/00* (2006.01)
*H04M 15/00* (2006.01)
(Continued)

(52) U.S. Cl.
CPC ............ *H04M 3/367* (2013.01); *H04H 20/59* (2013.01); *H04M 3/10* (2013.01); *H04M 3/2272* (2013.01);
(Continued)

(58) Field of Classification Search
CPC ...... H04H 20/59; H04M 15/58; H04M 15/60; H04M 15/61; H04M 2203/2077;
(Continued)

(56) References Cited

U.S. PATENT DOCUMENTS 4,163,124 A * 7/1979 Jolissaint ................. H04Q 3/64
379/266.01
5,828,652 A * 10/1998 Bales ..................... H04Q 11/04
370/225
(Continued)

FOREIGN PATENT DOCUMENTS

WO 9843451 10/1998
WO 9901970 1/1999

OTHER PUBLICATIONS

International Search Report and Written Opinion in International Application No. PCT/US2017/057696, dated Feb. 1, 2018, 13 pages.

*Primary Examiner* — Khai N. Nguyen
(74) *Attorney, Agent, or Firm* — Fish & Richardson P.C.

(57) ABSTRACT

A device is configured to detect congestion and throttle phone calls in a telephone communication system. The device receives, from a telephone dialing system, an indication indicating that a call to a phone number has successfully ended. In response to the indication, the device determines that a set of initial digits of the phone number matches a flooding group number of a flooding group, where the flooding group has a capacity limit. The device determines that a maximum number of concurrent active calls for the flooding group during a predefined period of time is within a predetermined threshold from the capacity limit of the flooding group and that no failed calls have occurred for the flooding group during the predefined period of time. In response to the determining, the device increases the capacity limit of the flooding group.

20 Claims, 10 Drawing Sheets

(51) Int. Cl.
*H04M 3/36* (2006.01)
*H04H 20/59* (2008.01)
*H04M 3/10* (2006.01)
*H04M 3/22* (2006.01)
*H04M 3/424* (2006.01)
*H04Q 11/04* (2006.01)

(52) U.S. Cl.
CPC ............ *H04M 3/424* (2013.01); *H04Q 11/04* (2013.01); *H04M 2215/7428* (2013.01); *H04M 2242/04* (2013.01); *H04Q 2213/13387* (2013.01)

(58) Field of Classification Search
CPC ..... H04M 2215/7428; H04M 2242/04; H04M 2242/22; H04M 3/10; H04M 3/22; H04M 3/2272; H04M 3/365; H04M 3/367; H04M 3/424; H04M 7/0084
USPC ................. 379/112.04, 112.08, 112.1, 221.03
See application file for complete search history.

(56) References Cited

U.S. PATENT DOCUMENTS

| | | | | |
|---|---|---|---|---|
| 5,933,481 A * | 8/1999 | MacDonald | .......... | H04M 15/00 379/112.01 |
| 6,735,291 B1 * | 5/2004 | Schmid | .............. | H04L 63/0218 379/189 |
| 6,862,453 B2 * | 3/2005 | Collins | .................. | H04W 88/14 370/229 |
| 6,909,708 B1 * | 6/2005 | Krishnaswamy | ... | H04L 12/1813 370/352 |
| 7,002,915 B1 * | 2/2006 | Huberman | .......... | H04M 7/1245 370/233 |
| 7,502,447 B2 * | 3/2009 | McCormick | ............ | H04M 3/08 379/1.01 |
| 7,539,176 B1 * | 5/2009 | Chellappa | ............... | H04L 45/04 370/230 |
| 8,688,072 B1 * | 4/2014 | Agarwal | ................ | H04W 12/06 379/126 |
| 8,908,507 B2 * | 12/2014 | Kovvali | ............ | H04W 28/0236 370/229 |
| 8,958,837 B2 * | 2/2015 | Shuman | .................. | H04W 4/10 455/518 |
| 9,300,564 B2 * | 3/2016 | Previdi | .................... | H04L 43/16 |
| 9,531,886 B2 * | 12/2016 | Wong | ...................... | H04M 3/36 |
| 9,571,667 B2 * | 2/2017 | Kimmel | ................ | H04M 3/36 |
| 9,582,985 B2 * | 2/2017 | Shurtz | .................. | H04W 4/90 |
| 9,654,648 B2 * | 5/2017 | Sharma | ............ | H04M 15/8061 |
| 9,654,649 B2 * | 5/2017 | Sharma | ............ | H04M 15/8061 |
| 9,800,722 B1 * | 10/2017 | Wu | ...................... | H04M 3/367 |
| 2006/0203995 A1 * | 9/2006 | Tan | ...................... | H04M 3/424 379/357.04 |
| 2009/0122701 A1 * | 5/2009 | Goldman | ................ | H04L 47/10 370/232 |
| 2013/0336109 A1 * | 12/2013 | Previdi | ................... | H04L 43/16 370/229 |

\* cited by examiner

CONGESTION DETECTION AND DYNAMIC THROTTLING OF AUTOMATED TELEPHONE CALL ATTEMPTS DURING MASS CALL EVENTS

The present application is a continuation of and claims priority to U.S. patent application Ser. No. 15/356,838, filed on Nov. 21, 2016, which is incorporated by reference in its entirety.

TECHNICAL FIELD

This disclosure relates to call management in telephone communication systems and, more specifically, to managing telephone communication systems to dynamically throttle call attempts and reduce congestions during mass call events.

BACKGROUND

A mass call event (MCE) is a situation in which an extraordinary high number of phone calls are simultaneously attempted in a telephone communication system. Typically, an MCE is triggered by a sudden emergency, such as the 2001 Sep. 11 terrorist attack and the 2013 Boston Marathon bombing. During an MCE, mass notification systems (MNSs) may, as part of a notification scheme, cause the generation a large number of telephone calls, typically using one or more automated telephone dialing systems. The large number of calls during an MCE can congest or flood the telephone system, degrade telephony services, and even make the services completely unavailable.

DESCRIPTION OF DRAWINGS

Like reference numbers and designations in the various drawings indicate like elements.

DETAILED DESCRIPTION

The present disclosure is directed to congestion detection and dynamic throttling of automated phone calls in telephone communication systems during mass call events. In some cases, during a mass call event (MCE), the massive number of concurrent calls may cause congestion (also known as flooding) in a telephone communication system and severely degrade telephony services such as increasing call failure rates. For example, during an MCE, mass notification systems (MNSs) can generate lists of telephone numbers, each list associated with an audio message, and send these telephone numbers to one or more automated telephone dialing systems (TDSs) for dialing. Each MNS then expects to receive the result of each call (success or failure) which the MNS can use for scheduling repeat calls and forensic analysis. Typically, MNSs are unaware of the physical infrastructure of the telephone system and the indiscriminate "dumping" telephone numbers to the TDSs can cause congestion in parts or all of the telephone system.

The described approach introduces a flooding detection and throttling system (FDTS) which can empirically and dynamically identify the parts of the telephone infrastructure that are congested (that is, identifying flooding group, as will be discussed in FIGS. 1-8) and update the call capacity limit associated with each flooding group. The FDTS can then throttle the rate or the number of concurrent calls delivered to the TDSs. The described methods and systems based on FDTS can automatically detect congestion situations in a telephone system and throttle call attempts accordingly. The operation of the FDTS can reduce congestion in the telephone system, improve utilization of resources in the system and increase call success rates during an MCE. The described approach can also be used to detect congestion and throttle call attempts in a private branch exchange (PBX) system.

Figure 1:
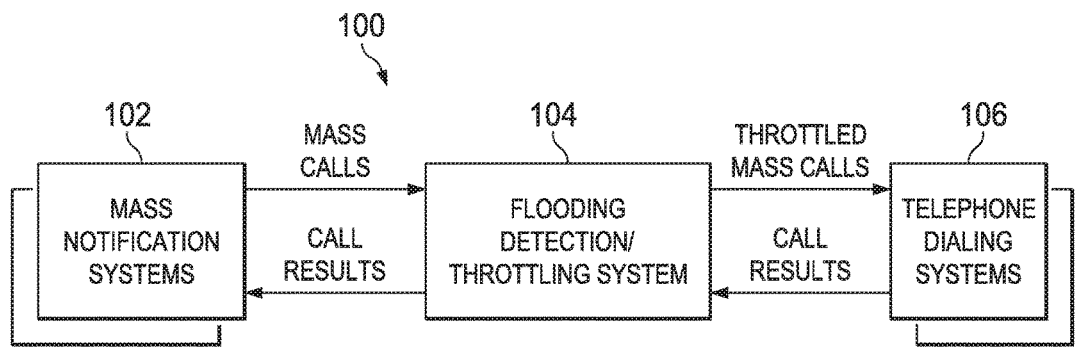
FIG. 1 is an example communication system that can detect flooding and throttle call attempts according to some implementations.

FIG. 1 is an example communication system 100 that can detect flooding and throttle call attempts according to some implementations. The example communication system 100 includes one or more MNSs 102, one or more TDSs 106, and a FDTS 104. The one or more MNSs 102 can generate a list of call attempts for the one or more TDSs 106 to dial, each call attempt associated with a phone number. For example, the MNSs 102 can provide a list of phone numbers and a notification message, and the TDSs 106 can dial these phone numbers accordingly to deliver the notification message.

For reducing congestion and improving call success rates during an MCE, a FDTS 104 can be included between the MNSs 102 and the TDSs 106 so that the FDTS 104 can detect flooding situations and throttle call attempts from the MNSs 102 by pacing the delivery of phone numbers to the TDSs 106 for dialing. Call results, such as call success or failure, provided by the TDSs 106, can help the FDTS 104 to detect flooding and throttle call attempts.

In some cases, the FDTS 104 can further send the call results to the MNSs 102 so that the MNSs 102 can perform forensic analysis. In some implementations, the call attempts are for voice calls. As understood by one of ordinary skill in the art, the call attempts can also be for video calls or other types of calls. In some cases, the call attempts can be for calls in circuit-switched networks, packet-switched networks, or other types of networks. In some implementations, the MNSs 102 can be on server(s) inside or outside networks of a telephone service provider, and the FDTS 104 and the TDSs 106 can be on server(s) in a central office of the telephone service provider. In some implementations, the FDTS 104 is on the server hosting the MNS 102, and the server can be anywhere on the Internet.

In operation, the FDTS 104 can form one or more flooding groups, each flooding group including phone numbers with the same initial digits. The value of the initial digits can be the group number of the flooding group. Each flooding group is associated with a capacity limit indicating an upper limit for the number of concurrent active calls the group can have without call failure. The FDTS 104 can throttle call attempts if the number of concurrent calls in the group is more than the capacity limit. For example, if the number of concurrent calls in the group exceeds the capacity limit, instead of sending the call attempt (i.e., the associated phone number) to the TDS 106, the FDTS 104 can place the phone number in a queue associated with the group for the TDS 106 to retry at a later time. The FDTS 104 can also dynamically adjust the capacity limit of each group over time based on call results, such as call success or failure, provided by the TDSs 106. Each flooding group can also be associated with a flooding limit indicating the number of concurrent calls the group can have for flooding detection. For example, flooding can be detected for a group if there is a call failure in the group and the number of concurrent calls in the group is more than the flooding limit. The FDTS 104 can form a new flooding group if there is a call failure and the number of concurrent calls for phone numbers having the same initial digits as the failed call is more than a predefined threshold. In some implementations, information of each flooding group, such as the group number, the capacity limit, and the flooding limit can be stored. Information of call events associated with each call, such as the time the call is connected or ended, can also be logged in a call record. In some implementations, initially there is no flooding group in the telephone communication system. As massive calls progress, the FDTS 104 detects flooding situations based on call results and starts to form flooding groups.

Two types of phone numbers, type 1 and type 2, are typically used. A type 1 phone number is in a form of a main number and an extension number. For example, a type 1 number in North America can be 203-123-4567 x 1234, where 203-123-4567 is the main number of 10 digits and 1234 is the extension number. A type 2 phone number has the same form as the main number of a type 1 number. For example, 203-111-2222 can be a type 2 number in North America. In some implementations, the main number of a type 1 number and a type 2 number can have 11 digits including a country code, for example, 1-203-111-2222. As understood by one of ordinary skill in the art, phone numbers in other regions can have numbers of digits other than 10 or 11.

For type 1 numbers, flooding groups can be formed based on the main number, i.e., the main number can be used as a flooding group number. For type 2 numbers, as will be discussed below, the number of initial digits used for the flooding group number can be determined. For example, the flooding group number can be the initial digits of the phone number without the last 3, 4, or 5 digits. In some cases, the last few digits that are not used for the flooding group number can also be called extension number. For example, for a type 2 phone number of 203-111-2222, the associated flooding group can have a group number of 203111, and the last four digits 2222 can be the extension number.

In some implementations, a server can receive, from a telephone dialing system, an indication indicating a call failure to a phone number. The server can have a queue. In response to receiving the indication, the server can determine that the phone number matches a known flooding group number based on initial digits of the phone number. The flooding group number is associated with a flooding group. The flooding group can include a plurality of phone numbers with initial digits having identical values to the flooding group number, and the plurality of phone numbers includes the phone number. The flooding group can be associated with a capacity limit. The capacity limit represents an upper limit for a number of concurrent active calls the flood group route through the telephone dialing system without call failures. In response to matching the flooding group number, the server can determine a time of the call failure and a number of concurrent active calls for the flooding group at the time of the call failure. In response to the number of concurrent active calls exceeding a predefined threshold, the sever can update the capacity limit for the flooding group based on the number of concurrent active calls and store the phone number in the queue. When a number of concurrent active calls for the flooding group at a second time is below the capacity limit, the server can transmit the phone number in the queue to the telephone dialing system to initiate a subsequent call to the phone number. In some cases, the queue is associated with the flooding group.

In some implementations, the server can receive, from the telephone dialing system, an indication indicating a second call failure to a second phone number. In response to the second call failure, the server can determine that the second phone number does not match any known flooding group number. The server can determine a new flooding group number based on initial digits of the second phone number. The server can determine a set of phone numbers including the second phone number, each phone number in the set having initial digits identical to the new flooding group number. The server can generate a new flooding group, the new flooding group including the set of phone numbers and associated with the new flooding group number. The server can determine a capacity limit for the new flooding group. When generating the new flooding group, the server can determine a time of the second call failure and a number of concurrent active calls for the set of phone numbers at the time of the second call failure. In response to the number of concurrent active calls at the time of the second call failure exceeding a predefined threshold, the server can generate the new flooding group and determine the capacity limit for the new flooding group based on the number of concurrent active calls at the time of the second call failure. In response to generating the new flooding group, the server can store information of the new flooding group. The stored information can include at least the flooding group number and the capacity limit. The server can also delete information of the flooding group when no calls to the phone numbers in the flooding group are attempted during a predefined period of time.

In some implementations, a phone number can be a type 1 phone number including a main number and an extension number, and the main number can be used as a flooding group number. In some implementations, a phone number can be a type 2 phone number and the server can determine a flooding group number based on initial digits of the phone number. For example, the server can determine a time of a call failure to a type 2 phone number. The server can determine a first number of concurrent active calls for a first set of phone numbers at the time of the call failure, each phone number in the first set having initial digits identical to the type 2 phone number excluding the last three digits. The server can determine a second number of concurrent active calls for a second set of phone numbers at the time of the call failure, each phone number in the second set having initial digits identical to the type 2 phone number excluding the last four digits. The server can determine a third number of concurrent active calls for a third set of phone numbers at the time of the call failure, each phone number in the third set having initial digits identical to the type 2 phone number excluding the last five digits. The server can determine the flooding group number associated with the type 2 number based on the first, second and third number of concurrent active calls.

In some implementations, the server can receive a third phone number to dial. The server can determine that the third phone number is associated with the flooding group, and determine a number of concurrent current active calls for the flooding group. If the number of concurrent current active calls for the flooding group is below the capacity limit of the flooding group, the server can transmit the third phone number to the telephone dialing system. If the number of concurrent current active calls has reached the capacity limit of the flooding group, the server can store the third phone number in the queue.

In some implementations, the server can receive from the telephone dialing system an indication that a call to a fourth phone number has successfully ended. In response to the successful call, the server can determine that the fourth phone number is associated with the flooding group. The server can determine that a maximum number of concurrent active calls for the flooding group during a predefined period of time is within a predetermined threshold from the capacity limit of the flooding group and determine that no failed calls have occurred for the flooding group during the predefined period of time. In response to the determination, the server can increase the capacity limit for the flooding group.

Figure 2:
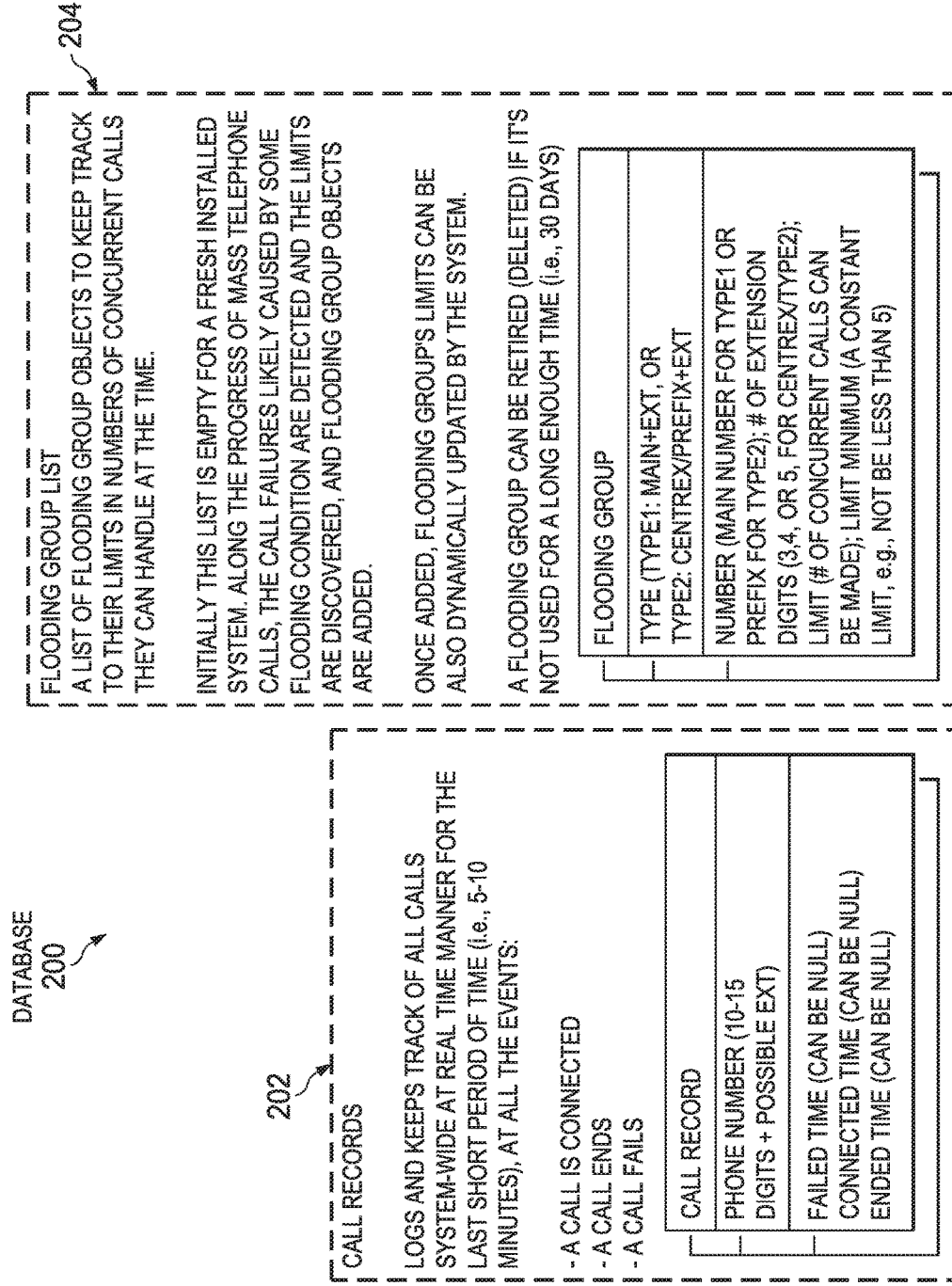
FIG. 2 is an example database for call records and a flooding group list according to some implementations.

FIG. 2 is an example database 200 for call records and a flooding group list according to some implementations. The database 200 can include call records 202 and a flooding group list 204. In some cases, the TDS can track and log every call the TDS dialed. For example, each call record 202 can be associated with a call and include the phone number of the call, a failed time (i.e., the time when the call is failed), a connected time (i.e., the time when the call is connected), or an ended time (i.e., the time when the call is ended). In some implementations, the TDS can update the call record 202 when a call event occurs. For example, when a call is failed to connect, the TDS can include the failed time in the call record 202 and leave the connected time and the ended time blank. When a call is connected, the TDS can include the connected time in the call record 202 and leave the failed time and the ended time blank. When a call is ended, the TDS can include the connected time and the ended time in the call record 202 and leave the failed time blank. In some implementations, to save memory, the TDSs may keep call records for calls during a last predefined period of time, for example, calls during the last 5 minutes. In some implementations, the TDS can provide the call records 202 to the FDTS.

The flooding group list 204 can include one or more flooding group objects. Each flooding group object includes information of a flooding group, such as a type of phone numbers in the flooding group (i.e., type 1 or type 2 number), a group number, a capacity limit (also called limit), and a flooding limit (also called limit minimum). In some implementations, the flooding limit can be a predefined constant, for example, a value not less than 5, and different flooding groups can have a same value or different values for the flooding limit. In some implementations, if the flooding group includes type 2 numbers, the flooding group object can also include the number of digits in the extension number, for example, the last 3, 4, or 5 digits. In some implementations, information of a flooding group can be deleted if no calls to phone numbers in the flooding group are attempted or no flooding has been detected for the group for a last predefined period of time, for example, the last 30 days.

Figure 3A:
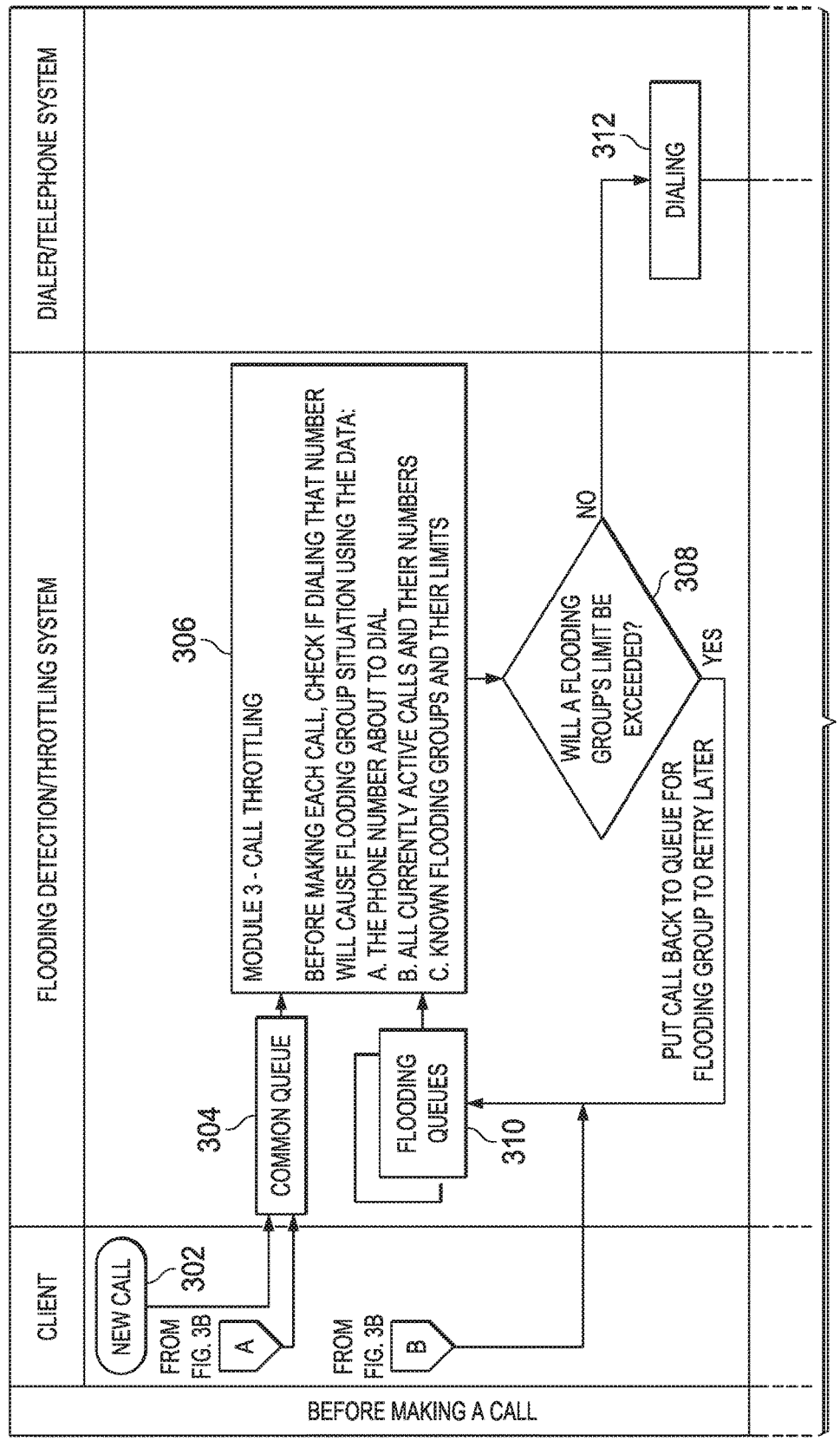
FIGS. 3A-3C are flowcharts illustrating an example method for flooding detection and throttling call attempts according to some implementations.
Figure 3B:
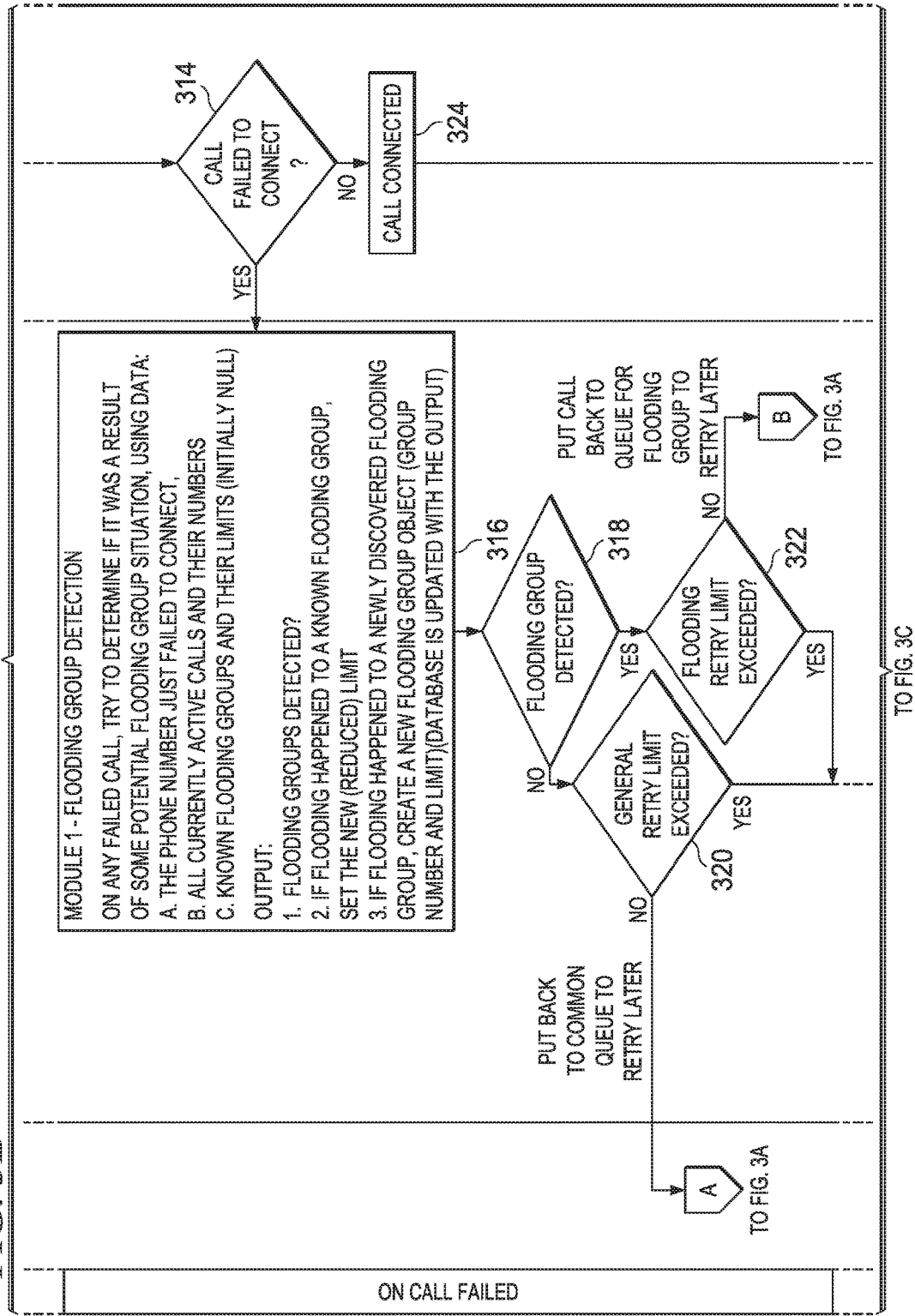
Figure 3C:
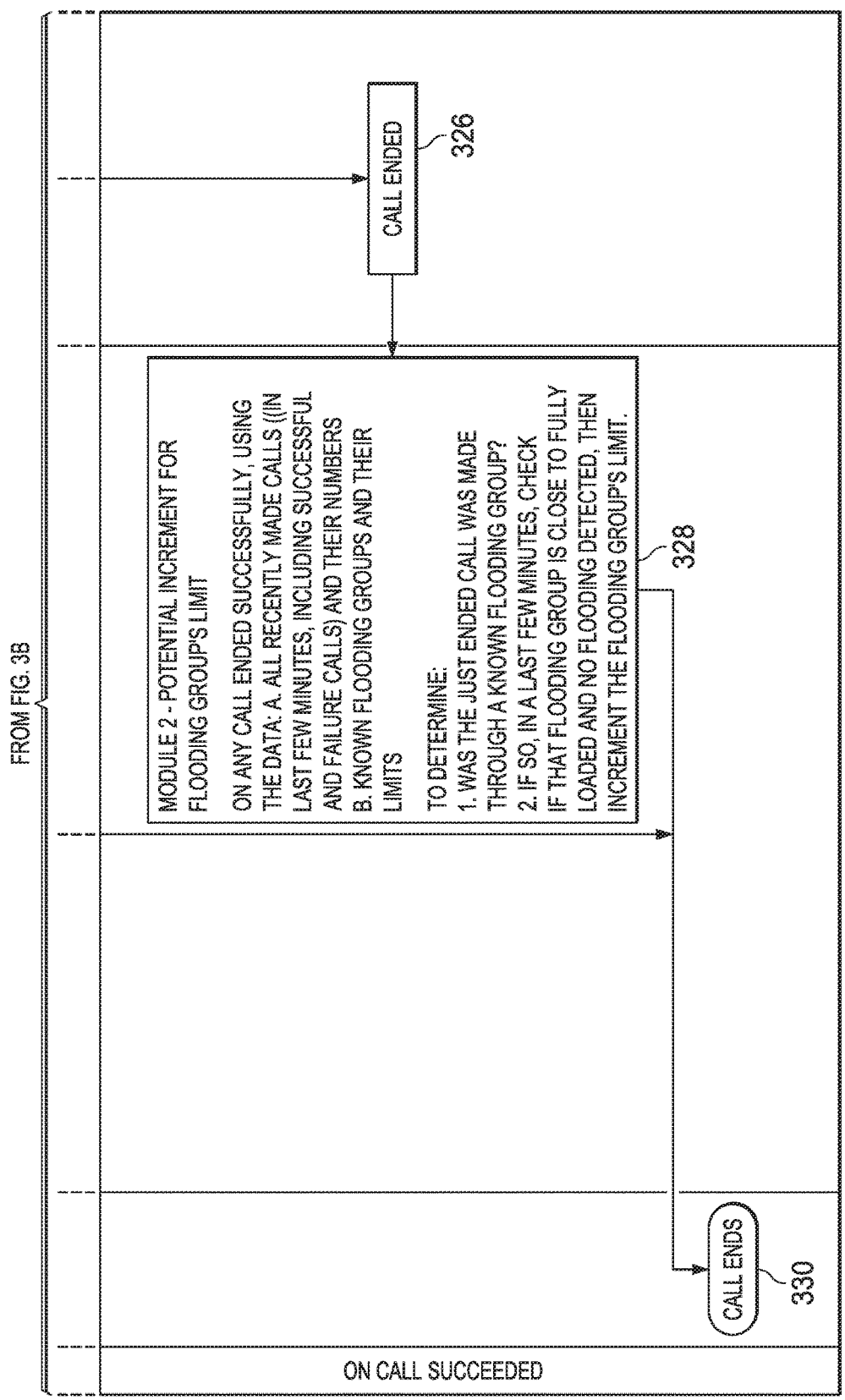

FIGS. 3A-3C are flowcharts illustrating an example method 300 for flooding detection and throttling call attempts according to some implementations. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

Figure 4:
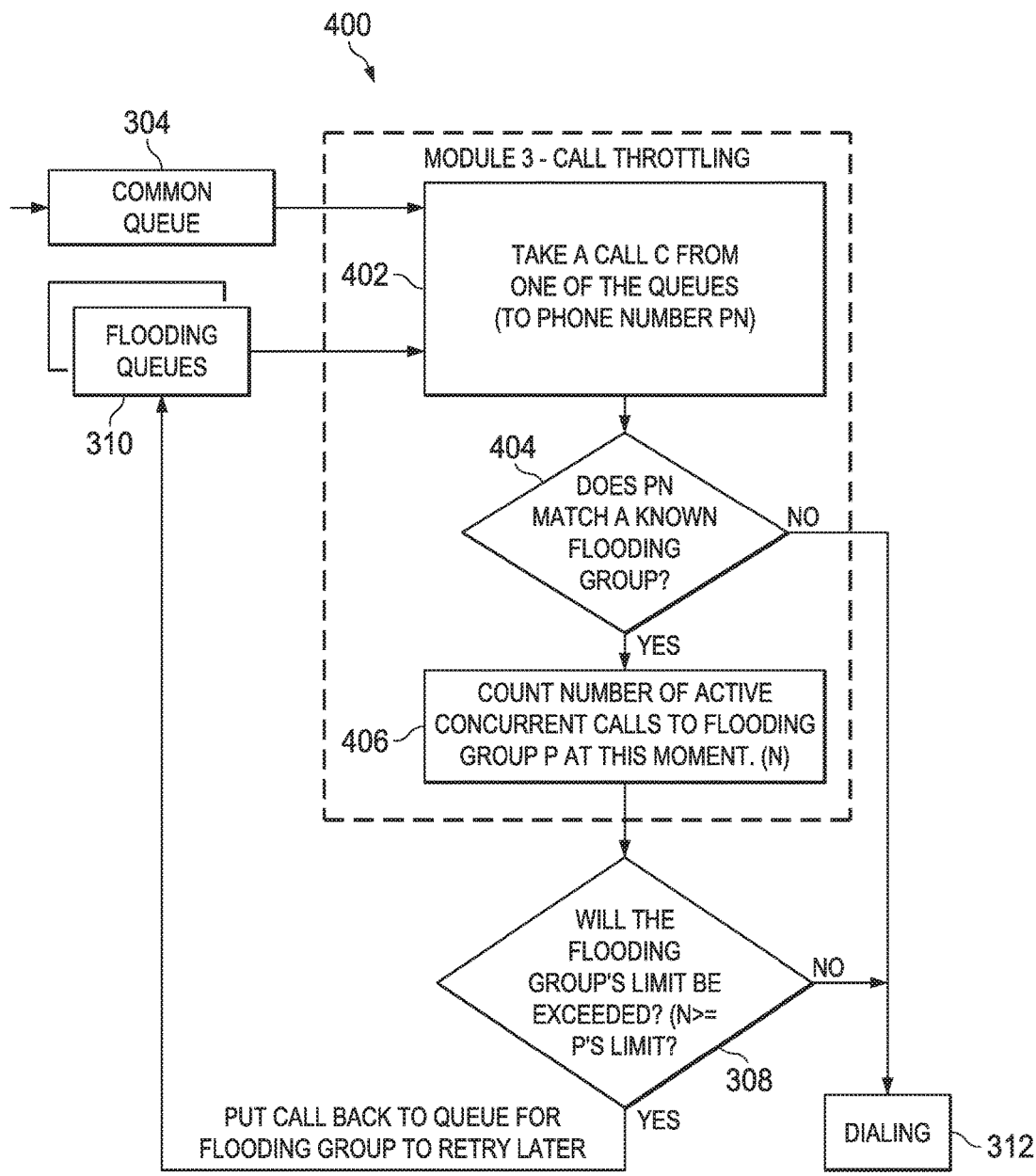
FIG. 4 is a flowchart illustrating an example method for throttling call attempts according to some implementations.

The method 300 starts at block 302 in FIG. 3A when an MNS, or some other system, generates a call attempt, for example, provides a phone number for sending a notification message. From block 302, the method 300 proceeds to block 304. At block 304, the phone number associated with the call attempt is placed in a common queue of the FDTS. In some implementations, other information associated with the phone number can also be placed in the queue, for example, the notification message associated with the phone number. From block 304, the method 300 proceeds to block 306. At block 306, the FDTS takes a phone number from either the common queue or, as will be discussed below, a flooding queue. From block 306, the method 300 proceeds to block 308. At block 308, the FDTS determines whether making a call associated with the phone number would cause flooding in the system. If the FDTS determines that making the call would not cause flooding, the method 300 proceeds from block 308 to block 312, where the FDTS sends the phone number to a TDS for dialing. If the FDTS determines that making the call would cause flooding, the method 300 proceeds from block 308 to block 310, where the FDTS sends the phone number to a flooding queue for retry at a later time. FIG. 4 provides additional details of block 306.

FIG. 4 is a flowchart illustrating an example method 400 for throttling call attempts according to some implementations. The method 400 starts at block 402 where the FDTS retrieves a phone number from either a common queue or a flooding queue. In some cases, multiple flooding queues can be implemented. For example, each flooding group can have a flooding queue, that is, a one-to-one mapping between a flooding group and a flooding queue. In some other cases, one flooding queue is implemented and all the flooding groups share this flooding queue. In some cases, the common queue and the flooding queue(s) can have the same priority, and the FDTS can randomly select a queue to retrieve a phone number. In some other cases, different queues can have different priorities. For example, the common queue can have a higher priority than the flooding queue(s) and the FDTS can first retrieve phone numbers from the common queue. The common queue and the flooding queue(s) can be implemented as part of the FDTS. From block 402, the method 400 proceeds to block 404.

At block 404, the FDTS determines whether the phone number retrieved at block 402 (i.e., the phone number that is about to be dialed) matches any known flooding group numbers stored in the flooding group list in the database. For example, the FDTS can compare the initial digits of the phone number to the stored flooding group numbers. In some cases, if the phone number is a type 1 number, the FDTS can compare the main number to the flooding group numbers in the database. If the phone number does not match any known flooding group number, the method 400 proceeds from block 404 to block 312, where the FDTS sends the phone number to a TDS for dialing. If the phone number matches a known flooding group number, the method 400 proceeds from block 404 to block 406.

At block 406, the FDTS can count the number of calls that are currently active for the phone numbers in the matched flooding group. In some cases, the FDTS can retrieve call records in the database that are associated with the phone numbers in the flooding group and determine the active calls. For example, a call record with a connected time but without an end time can indicate that the call is currently active. In some implementations, the FDTS can count the number of active calls at a time instant that the FDTS retrieves the phone number from the queue. From block 406, the method 400 proceeds to block 308. At block 308, the FDTS determines whether the number of calls that are currently active is equal to or more than the capacity limit of the flooding group. If the number of active calls is less than the capacity limit of the flooding group, the method 400 proceeds from block 308 to block 312, where the FDTS sends the phone number to a TDS for dialing and making the call. Otherwise, the method 400 proceeds from block 308 to block 310, where the FDTS sends the phone number to a flooding queue for retry at a later time. If there are multiple flooding queues, the FDTS can send the phone number to the flooding queue associated with the flooding group. In other words, if the capacity limit of the flooding group would be exceeded after making the call, the FDTS will throttle the call attempt. In some implementations, the FDTS can also send other information associated with the phone number to the queue, for example, the notification message to be delivered.

Figure 5:
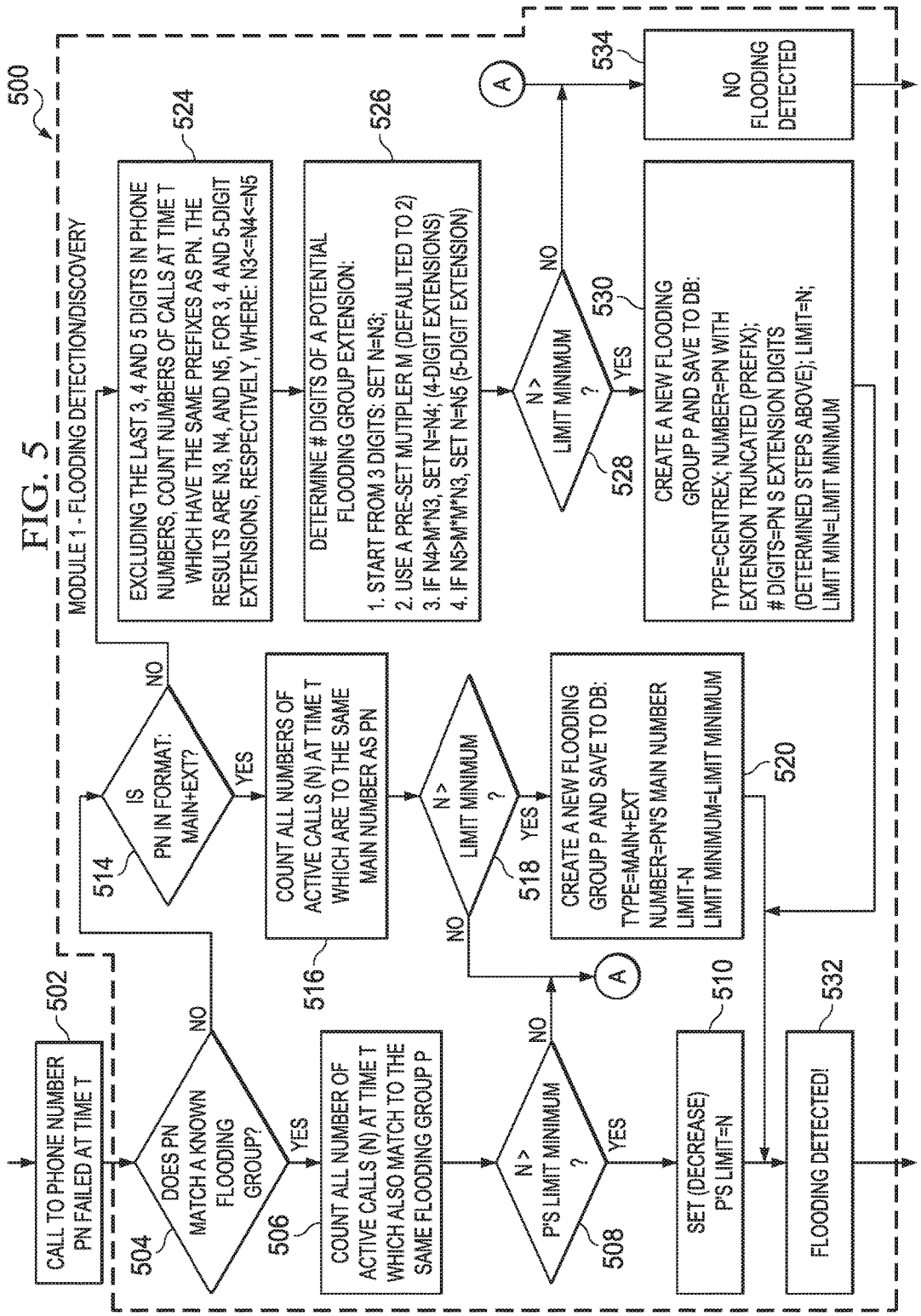
FIG. 5 is a flowchart illustrating an example method for flooding detection according to some implementations.

Turning from FIG. 3A to FIG. 3B, the method 300 proceeds from block 312 in FIG. 3A to block 314 in FIG. 3B. After the TDS dials the phone number (i.e., makes the call), at block 314, the TDS determines whether the call has failed to connect. For each failed call, the TDS can notify the FDTS of the call failure. If the call has failed to connect, the method 300 proceeds from block 314 to block 316. At block 316, the FDTS can determine whether it was a flooding situation that caused the call failure. If the flooding happened to a known flooding group, the FDTS can reduce the capacity limit of the flooding group. Otherwise, the FDTS can create a new flooding group. FIG. 5 provides additional details of block 316.

FIG. 5 is a flowchart illustrating an example method 500 for flooding detection according to some implementations. The method 500 starts at block 502 when a call has failed to connect. From block 502, the method 500 proceeds to block 504. At block 504, the FDTS determines whether the phone number of the failed call matches any of the known flooding groups stored in the database, for example, by comparing the initial digits of the phone number to the stored group numbers. The FDTS can also determine a time instant when the call failed, for example, based on the failed time in the call record of the failed call. The time instant when the call failed can be denoted as T. If the phone number of the failed call matches a known flooding group, the method 500 proceeds from block 504 to block 506. At block 506, the FDTS can count the number of calls that were active in the matched flooding group when the call failed, i.e., at the time T. For example, the FDTS can retrieve call records associated with phone numbers in the group and determine active calls in the group at the time T. In some implementations, the FDTS can determine the number of active calls at a time instant close to the time T, for example, within a predefined threshold from the time T. From block 506, the method 500 proceeds to block 508.

At block 508, the FDTS determines whether the number of active calls in the matched flooding group at the time T is more than the flooding limit of the group. If the number of active calls at the time T is less than or equal to the flooding limit, the method 500 proceeds from block 508 to block 534, where the FDTS determines that there was no flooding for the matched flooding group. In other words, the call failure was not caused by flooding and may be caused by some other errors, for example, the TDS dialed a wrong phone number. If the number of active calls at the time T is more than the flooding limit, the method 500 proceeds from block 508 to block 510, where the FDTS sets (or decreases) the capacity limit of the matched flooding group to the number of active calls at the time T. From block 510, the method 500 proceeds to block 532. At block 532, the FDTS determines that flooding has detected for the matched flooding group and the call failure was caused by the flooding. In other words, when flooding is detected for a known flooding group, the FDTS will reduce the capacity limit to reflect the number of concurrent calls the flooding group can currently handle without failure. Note that, at block 312 in FIG. 3, the TDS makes the call because the FDTS has determined at block 308 that making the call would not exceed the capacity limit of the flooding group and no call failure would be expected. At block 510, when the call has failed, it indicates that the previous capacity limit is too high and does not represent the number of active calls the flooding group can currently handle. Therefore, the FDTS reduces the capacity limit. From block 532, the method 500 returns to block 316 in FIG. 3B.

If the FDTS determines that the phone number of the failed call does not match any of the known flooding groups, the method 500 proceeds from block 504 to block 514. At block 514, the FDTS determines if the phone number of the failed call is a type 1 number, i.e., in the form of a main number and an extension number. If the phone number is a type 1 number, the method 500 proceeds from block 514 to block 516. At block 516, the FDTS can count the number of active calls at the time T that called to the same main number as the failed call. For example, the FDTS can retrieve call records associated with phone numbers having the same main number as the failed call, and determine active calls at the time T. From block 516, the method 500 proceeds to block 518. At block 518, the FDTS determines whether the number of active calls at the time T is more than a predefined threshold, for example, a value not less than 5. The predefined threshold is a parameter used for flooding detection. In some implementations, if the flooding groups have a same value for flooding limit, that value can be used as the predefined threshold. If the number of active calls at the time T is less than or equal to the predefined threshold, the method 500 proceeds from block 518 to block 534, where the FDTS determines that no flooding occurred and the failed call was not caused by flooding. From block 534, the method 500 returns to block 316 in FIG. 3B. If the number of active calls at the time T is more than the predefined threshold, the method 500 proceeds from block 518 to block 520, where the FDTS determines that the failed call was caused by flooding and creates a new flooding group. The new flooding group is for type 1 numbers. The flooding group number can be set as the main number of the failed call. The capacity limit can be set as the number of active calls at the time T, i.e., when the call failed. The flooding limit can be set as the predefined threshold used for flooding detection. In some implementations, the information of the new flooding group, such as the type of phone number, the group number, the capacity limit, and the flooding limit, can be stored. For example, a new flooding group object can be created in the flooding group list in the database. From block 520, the method 500 proceeds to block 532. At block 532, the FDTS determines that flooding has detected for the newly created flooding group.

If the FDTS determines that the phone number of the failed call is not a type 1 number, i.e., a type 2 number, the method 500 proceeds from block 514 to block 524, where the FDTS will determine the number of digits in the extension number. As will be discussed below, in some implementations, the FDTS will determine whether the last 3, 4, or 5 digits are the extension number. In some cases, the extension number can have a number of digits other than 3, 4, or 5. At block 524, the FDTS can determine the respective numbers of active calls at the time T for phone numbers that have the initial digits same as the failed call number excluding the last 3 digits, the last 4 digits, and the last 5 digits, denoted as N3, N4, and N5, respectively. For example, if the phone number of the failed call is 203-123-4567, the FDTS can find a first set of phone numbers having initial digits of 2031234 (i.e., excluding the last 3 digits of the failed call number), count the number of active calls at the time T among the first set of phone numbers, and denote the number of active calls as N3. The FDTS can find a second set of phone numbers having initial digits of 203123 (i.e., excluding the last 4 digits of the failed call number), count the number of active calls at the time T among the second set of phone numbers, and denote the number of active calls as N4. The FDTS can find a third set of phone numbers having initial digits of 20312 (i.e., excluding the last 5 digits of the failed call number), count the number of active calls at the time T among the third set of phone numbers, and denote the number of active calls as N5. Note that N3<=N4<=N5 because the third set of phone numbers having initial digits of 20312 is larger than the second set of phone numbers having initial digits of 203123 or the first set of phone numbers having initial digits of 2031234, and hence has more concurrently active calls. From block 524, the method 500 proceeds to block 526.

At block 526, the FDTS determines the number of digits in the extension number. In some implementation, the following steps can be used:
1. Set N=N3;
2. Predefine a multiplier M, for example M=2 or other values;
3. If N4>M*N3, set N=N4;
4. If N5>M*M*N3, set N=N5;
5. If N=N3, the FDTS determines that the last 3 digits are the extension number; if N=N4, the last 4 digits are the extension number; if N=N5, the last 5 digits are the extension number.

From block 526, the method 500 proceeds to block 528.

At block 528, the FDTS determines whether the number of active calls at the time T corresponding to the determined number of extension digits, N, is less than or equal to the predefined threshold used for flood detection. If the number of active calls, N, is less than or equal to the predefined threshold, the method 500 proceeds from block 528 to block 534, the FDTS determines that no flooding occurred. If the number of active calls, N, is more than the predefined threshold, the method 500 proceeds from block 528 to block 530, where the FDTS can create a new flooding group. For example, if the FDTS determines that the last 3 digits are extension number, the FDTS will compare N3 to the predefined threshold to decide whether to create a new flooding group. The new flooding group is for type 2 numbers. The flooding group number can be set as the phone number of the failed call without the extension digits, i.e., without the last 3, 4, or 5 digits as determined at block 526. The capacity limit can be set as N, i.e., the number of active calls at time T corresponding to the determined number of extension digits. The flooding limit can be set as the predefined threshold used for flooding detection. In some implementations, the information of the new flooding group, such as the type of phone number, the group number, the capacity limit, the flooding limit, and the number of digits in extension can be stored. For example, a new flooding group object can be created in the flooding group list in the database. From block 530, the method 500 proceeds to block 532. At block 532, the FDTS determines that flooding has detected for the new flooding group.

Turning back to FIG. 3B, the method 300 proceeds from block 316 to block 318. At block 318, the FDTS determines if flooding has been detected and determines whether to retry the failed call. In some cases, a failed call can be retried for a limited number of times before ending the call. For example, the FDTS can request the TDS to re-dial the phone number of a failed call. After a number of unsuccessful retires, the FDTS can notify the MNS of the unsuccessful call attempt and end the call attempt. In some implementations, different numbers of retries can be used for a call failed due to flooding and a call failed due to a general error, such as dialing a wrong number. If flooding has been detected, the FDTS determines that the call failure was due to flooding and the method 300 proceeds from block 318 to block 322. At block 322, the FDTS determines if a retry limit for flooding has been exceeded. If the retry limit has not been exceeded, at block 310, the FDTS can place the phone number of the failed call into a flooding queue, for example, the flooding queue of the flooding group associated with the phone number, for retry at a later time. If the retry limit has been exceeded, the method 300 proceeds from block 322 to block 330, where the FDTS notifies the MNS of the unsuccessful call attempt and ends the call attempt without further retry.

If flooding has not been detected, the FDTS determines that the call failure could be due to a general error and the method 300 proceeds from block 318 to block 320. At block 320, the FDTS determines if a retry limit for a general error has been exceeded. If the retry limit has not been exceeded, the method proceeds from block 320 to block 304. At block 304, the FDTS can place the phone number of the failed call into the common queue for retry at a later time. If the retry limit has been exceeded, the method 300 proceeds from block 320 to block 330, where the FDTS notifies the MNS of the unsuccessful call attempt and ends the call attempt without further retry.

Figure 6:
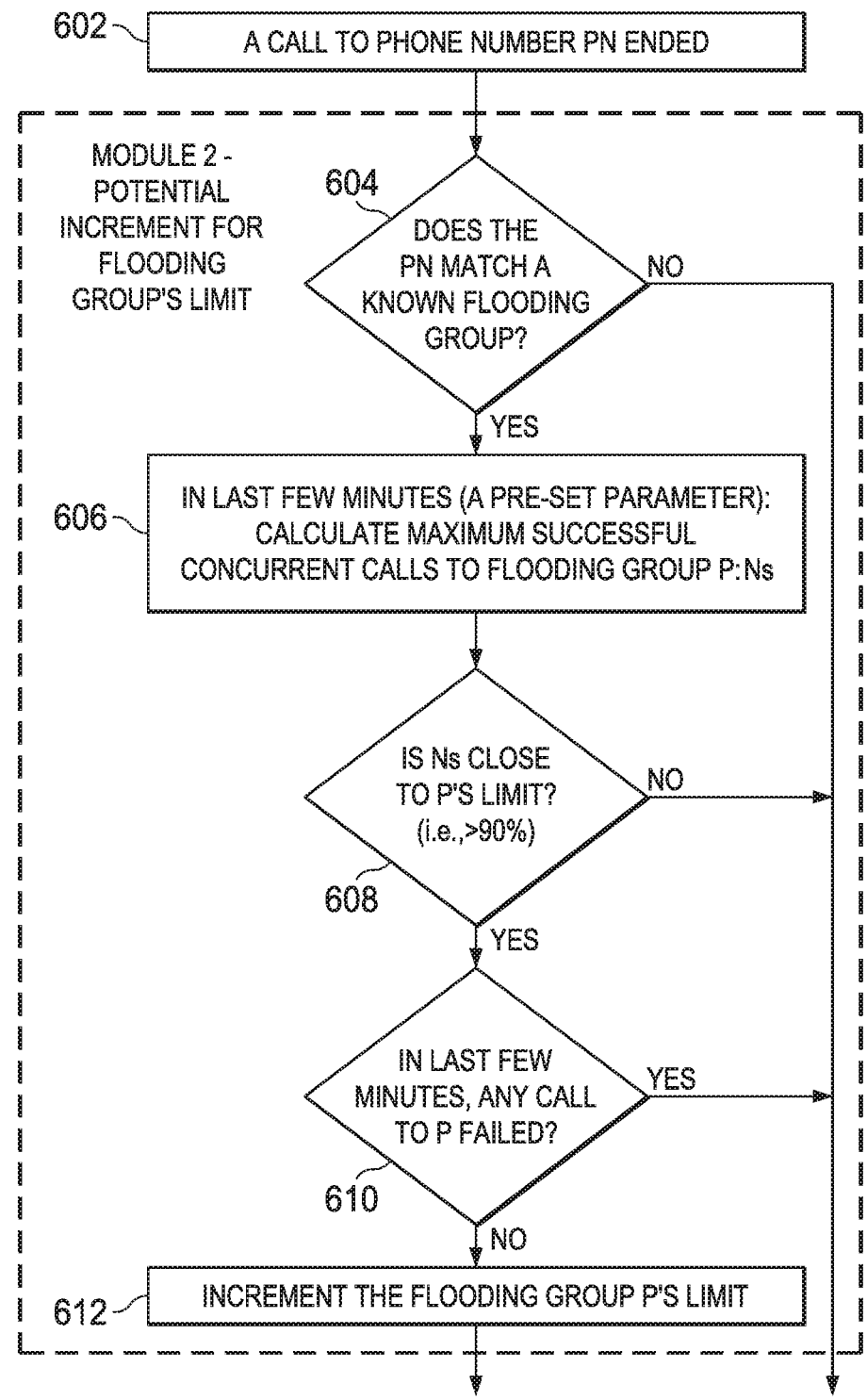
FIG. 6 is a flowchart illustrating an example method for increasing a capacity limit of a flooding group according to some implementations.

For a successfully connected call, the method 300 proceeds from block 314 to block 324 when the call is connected. When the call is ended, turning from FIG. 3B to FIG. 3C, the method 300 proceeds from block 324 in FIG. 3B to block 326 in FIG. 3C. For each successfully ended call, the TDS can notify the FDTS of the call success, and the method 300 proceeds from block 326 to block 328. At block 328, the FDTS determines whether to increase the capacity limit of the flooding group that is associated with the phone number of the successfully ended call. In some implementations, the FDTS can increase the capacity limit if in the last few minutes, or some other predefined duration of time, the maximum number of concurrent active calls in the flooding group is close to the capacity limit, for example, within a predefined threshold, and no failure call was detected for the flooding group. FIG. 6 provides additional details of block 328. From block 328, the method 300 proceeds to block 330. The method 300 stops at block 330.

FIG. 6 is a flowchart illustrating an example method 600 for increasing a capacity limit of a flooding group according to some implementations. The method 600 starts at block 602 when a call to a phone number has successfully ended. From block 602, the method 600 proceeds to block 604. At block 604, the FDTS determines if the phone number of the successfully ended call matches any of the known flooding groups. If the phone number does not match a known flooding group, the method 600 returns to block 328 in FIG. 3C. If the phone number matches a known flooding group, the method 600 proceeds from block 604 to block 606. At block 606, the FDTS determines a maximum number of concurrent active calls for the flooding group during a last predefined period of time, for example, during the last few minutes. In some implementations, the FDTS can count the number of active calls in the flooding group at multiple time instants during the last predefined period of time and determine a maximum number of active calls among the multiple time instants. For example, a call was successfully ended at time Ts. To determine the maximum number of active calls during the last 5 minutes, the FDTS can retrieve call records associated with the phone numbers in the matched flooding group. The FDTS can count the number of active calls in the group at every one minute, for example, at time instants of (Ts-1) minute, (Ts-2) minute, (Ts-3) minute, (Ts-4) minute, and (Ts-5) minute. The FDTS can determine the largest number of active calls from these five time instants and denote as Ns. From block 606, the method 600 proceeds to block 608. At block 608, the FDTS determines whether the maximum number of active calls during the last predefined period of time, Ns, is close to the capacity limit of the matched flooding group. In some implementations, the FDTS can determine if Ns is within a predefined threshold from the capacity limit, for example, if Ns is more than 90% of the capacity limit. If the maximum number of active calls during the last predefined period of time, Ns, is not close to the capacity limit of the flooding group, the method 600 returns to block 328 in FIG. 3C. If the maximum number of active calls during the last predefined period of time, Ns, is close to the capacity limit of the flooding group, the method 600 proceeds from block 608 to block 610. At block 610, the FDTS then determines if any call to phone numbers in the flooding group has failed during the last predefined period of time. For example, the FDTS can retrieve call records of the phone numbers in the flooding group, and check if there is any call record having a failed time that is within the last predefined period of time. If there are failed calls to the flooding group during the last predefined period of time, the method 600 returns to block 328 in FIG. 3C. If there is no failed call to the flooding group during the last predefined period of time, the method 600 proceeds from block 610 to block 612. At block 612, the FDTS can increase the capacity limit of the flooding group. For example, the capacity limit can be incremented by a predefined value, for example, a value of one or some other value. From block 612, the method 600 returns to block 328 in FIG. 3C.

Figure 7:
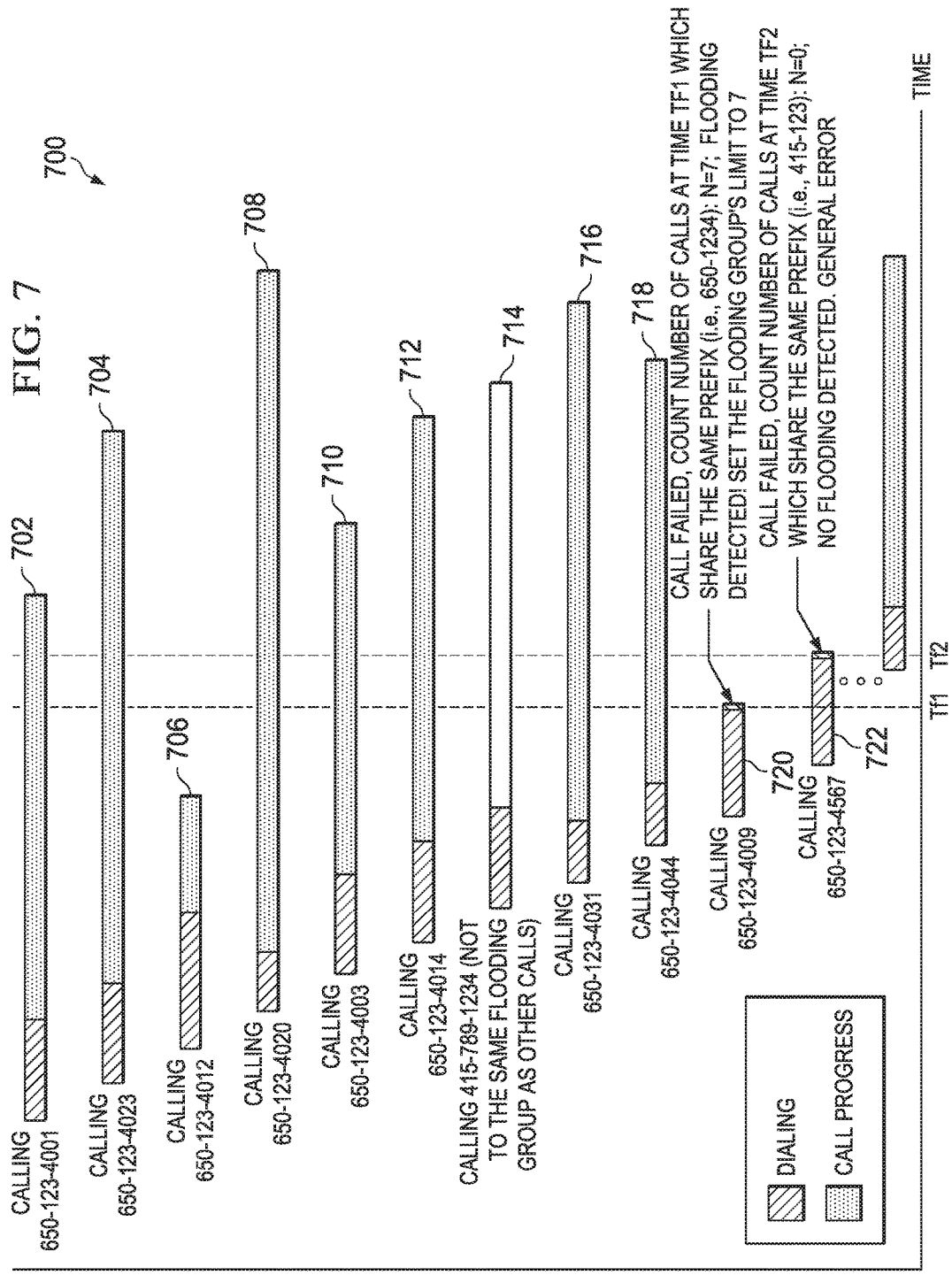
FIG. 7 illustrates an example of flooding detection according to some implementations.

FIG. 7 illustrates an example of flooding detection according to some implementations. FIG. 7 shows time durations of phone calls 702, 704, 706, 708, 710, 712, 714, 716, 718, 720, and 722. Each call is represented by a bar including a time duration for dialing the call and a time duration when the call is in connection. At time Tf1 when the call 720 to the phone number 650-123-4009 is failed, the FDTS determines that the number 650-123-4009 matches a known flooding group with group number 6501234 (i.e., 3-digits extension). The FDTS also determines that the flooding group includes phone numbers of calls 702, 704, 706, 708, 710, 712, 716, 718 and 720. The FDTS counts the number of active calls at time Tf1 in the flooding group. As shown in FIG. 7, 7 calls, i.e., calls 702, 704, 708, 710, 712, 716, and 718, were active at time Tf1 in the flooding group. If the flooding limit for the flooding group is 5, the FDTS will determine that flooding has detected for the group and set the capacity limit of the group as 7.

At time Tf2 when the call 722 to the phone number 415-123-4567 has failed, the FDTS determines that the phone number 415-123-4567 matches a known flooding group with group number 415123 (i.e., 4-digits extension). The FDTS counts the number of active calls at time Tf2 in the flooding group. As shown in FIG. 7, no call was active at time Tf2 in the flooding group. The FDTS will determine that there was no flooding for the group and the failure of the call 722 was due to a general error, such as dialing a wrong phone number or some other error.

Figure 8:
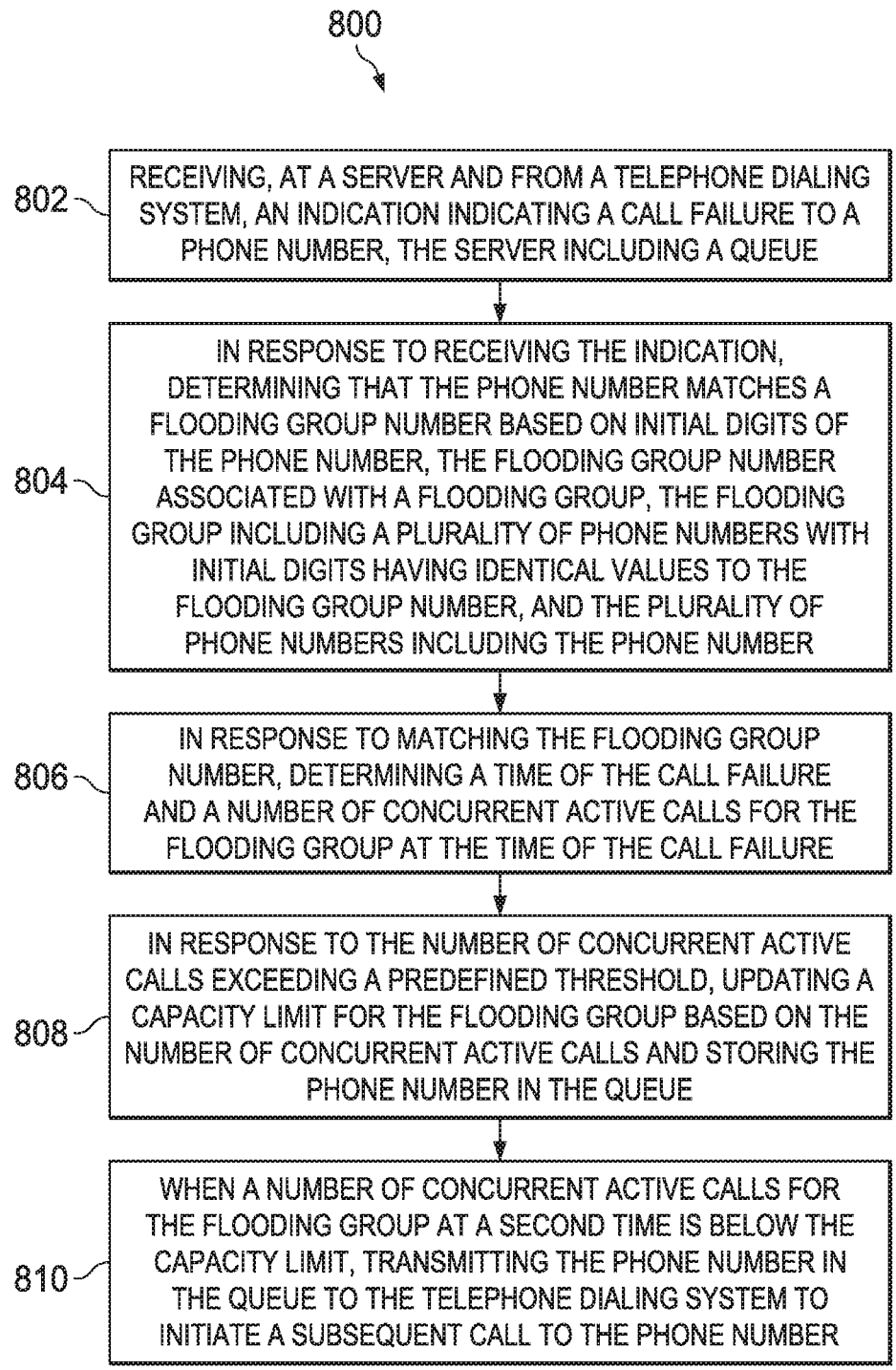
FIG. 8 is a flowchart illustrating a second example method for flooding detection and throttling call attempts according to some implementations.

FIG. 8 is a flowchart illustrating a second example method 800 for flooding detection and throttling call attempts according to some implementations. The method 800 starts at block 802, where a FDTS receives from a TDS an indication indicating a call failure to a phone number. The indication of a call failure can be a busy tone, an audio message indicating call failure, or other types of indication consistent with this disclosure. In some implementations, the FDTS can include a queue. At block 804, in response to receiving the indication, the FDTS can determine that the phone number matches a flooding group number based on initial digits of the phone number, the flooding group number associated with a flooding group. The flooding group can include a plurality of phone numbers with initial digits having identical values to the flooding group number, and the plurality of phone numbers can include the phone number. For example, for a type 1 phone number, the FDTS can compare the main number to the known flooding group numbers. The flooding group can be associated with a capacity limit. The capacity limit represents an upper limit for a number of concurrent active calls the flood group route through the TDS without call failures. At block 806, in response to matching the flooding group number, the FDTS can determine a time of the call failure and a number of concurrent active calls for the flooding group at the time of the call failure. For example, the FDTS can retrieve call records of the plurality of phone numbers in the flooding group and determine calls in the group that were active at the time of the call failure.

At block 808, in response to the number of concurrent active calls exceeding a predefined threshold, the FDTS can update the capacity limit for the flooding group based on the number of concurrent active calls and store the phone number in the queue for retry at a later time. In some implementations, each flooding group can have its own queue. In some other implementations, all flooding groups can shared one queue. At block 810, when a number of concurrent active calls for the flooding group at a second time is below the capacity limit, the FDTS can transmit the phone number in the queue to the TDS to initiate a subsequent retry call to the phone number. In some implementations, the FDTS can retrieve the phone number from the queue and determine that the phone number is associated with the flooding group. The FDTS can determine the number of concurrent active calls for the flooding group at the second time. If the number of concurrent active calls at the second time is below the capacity limit of the flooding group, the FDTS can transmit the phone number to the TDS to initiate a retry call. If the number of concurrent active calls at the second time has reached the capacity limit of the flooding group, the FDTS can store the phone number in the queue for retry at a later time. In some implementations, the second time can be the time instant when the FDTS retrieves the phone number from the queue.

Figure 9:
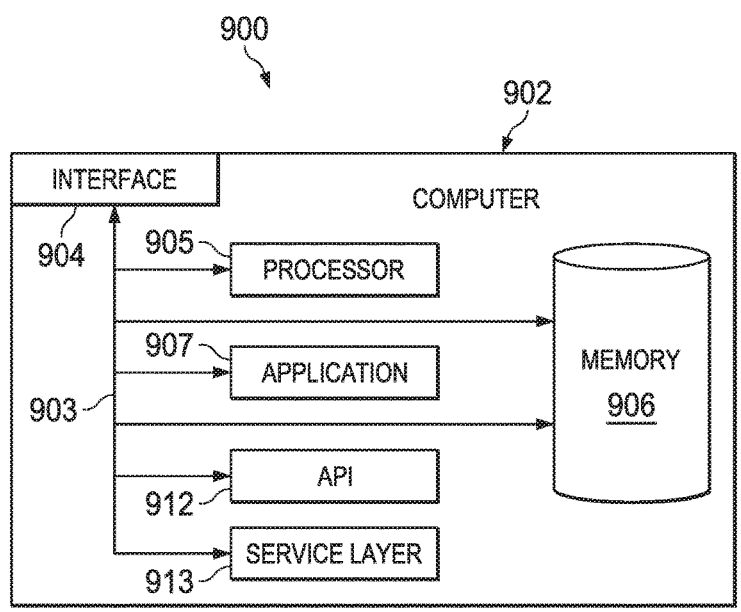
FIG. 9 is a block diagram of an exemplary computer system used to provide functionalities associated with described algorithms, methods, functions, processes, flows, and procedures as described in the instant disclosure, according to some implementations.

FIG. 9 is a block diagram of an exemplary computer system 900 used to provide functionalities associated with described algorithms, methods, functions, processes, flows, and procedures as described in the instant disclosure, according to some implementations. The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 902 may comprise of a computer that includes an input device, such as a keypad, keyboard, touch screen, or other device that can accept user information, and an output device that conveys information associated with the operation of the computer 902, including digital data, visual, or audio information (or a combination of information), or a GUI.

The computer 902 can serve in a role as a client, network component, a server, a database or other persistency, or any other component (or a combination of roles) of a computer system for performing the subject matter described in the instant disclosure. For example, the computer 902 may be used to implement one or more functions of FDTS. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, e-mail server, web server, caching server, streaming data server, business intelligence (BI) server, or other server (or a combination of servers).

The computer 902 can receive requests from a client application (for example, executing on another computer 902) and respond to the received requests by processing the said requests in an appropriate software application. In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, both hardware or software (or a combination of hardware and software), may interface with each other or the interface 904 (or a combination of both) over the system bus 903, using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems in a distributed environment. Generally, the interface 904 comprises logic encoded in software or hardware (or a combination of software and hardware).

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a memory 906 that holds data for the computer 902. For example, memory 906 can be a database storing data consistent with this disclosure. Although illustrated as a single memory 906 in FIG. 9, two or more memories may be used according to particular needs, desires, or particular implementations of the computer 902 and the described functionality. While memory 906 is illustrated as an integral component of the computer 902, in alternative implementations, memory 906 can be external to the computer 902.

The application 907 is an algorithmic software engine providing functionality according to particular needs, desires, or particular implementations of the computer 902, particularly with respect to functionality described in this disclosure. For example, application 907 can serve as one or more components, modules, applications, etc. Further, although illustrated as a single application 907, the application 907 may be implemented as multiple applications 907 on the computer 902. In addition, although illustrated as integral to the computer 902, in alternative implementations, the application 907 can be external to the computer 902.

There may be any number of computers 902 associated with, or external to, a computer system containing computer 902. Further, the term "client," "user," and other appropriate terminology may be used interchangeably, as appropriate, without departing from the scope of this disclosure. Moreover, this disclosure contemplates that many users may use one computer 902, or that one user may use multiple computers 902.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

The invention claimed is:

1. A device, comprising:
a memory; and
at least one hardware processor communicatively coupled with the memory and configured to:
receive, from a telephone dialing system, an indication indicating that a call to a phone number has successfully ended;
in response to the indication indicating that the call to the phone number has successfully ended, determine that a set of initial digits of the phone number matches a flooding group number of a flooding group, wherein the flooding group includes a plurality of phone numbers, the set of initial digits of each of the plurality of phone numbers has values identical to the flooding group number, the plurality of phone numbers includes the phone number, and the flooding group has a capacity limit;
determine that a maximum number of concurrent active calls for the flooding group during a predefined period of time is within a predetermined threshold from the capacity limit of the flooding group and determine that no failed calls have occurred for the flooding group during the predefined period of time; and
in response to determining that the maximum number of concurrent active calls for the flooding group during the predefined period of time is within the predetermined threshold from the capacity limit of the flooding group and in response to determining that no failed calls have occurred for the flooding group during the predefined period of time, increase the capacity limit of the flooding group.

2. The device of claim 1, wherein the at least one hardware processor is further configured to:
receive a second phone number to dial;
determine that the set of initial digits of the second phone number matches the flooding group number of the flooding group;
determine a number of concurrent current active calls for the flooding group;
in response to the number of concurrent current active calls for the flooding group below the capacity limit of the flooding group, transmit the second phone number to the telephone dialing system;
after transmitting the second phone number, receive, from the telephone dialing system, an indication indicating a call failure to the second phone number; and
in response to receiving the indication indicating the call failure to the second phone number, decrease the capacity limit of the flooding group.

3. The device of claim 1, wherein the at least one hardware processor is further configured to:
receive a second phone number to dial;
determine that the set of initial digits of the second phone number matches the flooding group number of the flooding group;
determine a number of concurrent current active calls for the flooding group; and
in response to the number of concurrent current active calls for the flooding group exceeding the capacity limit of the flooding group, store the second phone number in a queue.

4. The device of claim 1, wherein the at least one hardware processor is further configured to:
receive, from the telephone dialing system, an indication indicating a call failure to a second phone number;
in response to the call failure, determine that initial digits of the second phone number do not match any flooding group number;
determine a new flooding group number based on initial digits of the second phone number;
determine a set of phone numbers including the second phone number, each phone number in the set of phone numbers having initial digits identical to the new flooding group number; and
generate a new flooding group, the new flooding group including the set of phone numbers and associated with the new flooding group number.

5. The device of claim 4, wherein generating the new flooding group comprises:
determining a time of the call failure and a number of concurrent active calls for the set of phone numbers at the time of the call failure;
in response to the number of concurrent active calls exceeding a predefined threshold, generating the new flooding group; and
determining a capacity limit of the new flooding group based on the number of concurrent active calls at the time of the call failure.

6. The device of claim 4, wherein the second phone number includes a main number and an extension number, and determining the new flooding group number includes using the main number as the new flooding group number.

7. The device of claim 4, wherein determining the new flooding group number comprises:
determining a time of the call failure;
determining a first number of concurrent active calls for a first set of phone numbers at the time of the call failure, each phone number in the first set of phone numbers having initial digits identical to the second phone number excluding last three digits;

determining a second number of concurrent active calls for a second set of phone numbers at the time of the call failure, each phone number in the second set of phone numbers having initial digits identical to the second phone number excluding last four digits;

determining a third number of concurrent active calls for a third set of phone numbers at the time of the call failure, each phone number in the third set of phone numbers having initial digits identical to the second phone number excluding last five digits; and determining the new flooding group number based on the first, second and third number of concurrent active calls.

8. A method, comprising:

receiving, from a telephone dialing system, an indication indicating that a call to a phone number has successfully ended;

in response to the indication indicating that the call to the phone number has successfully ended, determining that a set of initial digits of the phone number matches a flooding group number of a flooding group, wherein the flooding group includes a plurality of phone numbers, the set of initial digits of each of the plurality of phone numbers has values identical to the flooding group number, the plurality of phone numbers includes the phone number, and the flooding group has a capacity limit;

determining that a maximum number of concurrent active calls for the flooding group during a predefined period of time is within a predetermined threshold from the capacity limit of the flooding group and determining that no failed calls have occurred for the flooding group during the predefined period of time; and in response to determining that the maximum number of concurrent active calls for the flooding group during the predefined period of time is within the predetermined threshold from the capacity limit of the flooding group and in response to determining that no failed calls have occurred for the flooding group during the predefined period of time, increasing the capacity limit of the flooding group.

9. The method of claim 8, further comprising:

receiving a second phone number to dial;

determining that the set of initial digits of the second phone number matches the flooding group number of the flooding group;

determining a number of concurrent current active calls for the flooding group;

in response to the number of concurrent current active calls for the flooding group below the capacity limit of the flooding group, transmitting the second phone number to the telephone dialing system;

after transmitting the second phone number, receiving, from the telephone dialing system, an indication indicating a call failure to the second phone number; and in response to receiving the indication indicating the call failure to the second phone number, decreasing the capacity limit of the flooding group.

10. The method of claim 8, further comprising:

receiving a second phone number to dial;

determining that the set of initial digits of the second phone number matches the flooding group number of the flooding group;

determining a number of concurrent current active calls for the flooding group; and in response to the number of concurrent current active calls for the flooding group exceeding the capacity limit of the flooding group, storing the second phone number in a queue.

11. The method of claim 8, further comprising:

receiving, from the telephone dialing system, an indication indicating a call failure to a second phone number;

in response to the call failure, determining that initial digits of the second phone number do not match any flooding group number;

determining a new flooding group number based on initial digits of the second phone number;

determining a set of phone numbers including the second phone number, each phone number in the set of phone numbers having initial digits identical to the new flooding group number; and generating a new flooding group, the new flooding group including the set of phone numbers and associated with the new flooding group number.

12. The method of claim 11, wherein generating the new flooding group comprises:

determining a time of the call failure and a number of concurrent active calls for the set of phone numbers at the time of the call failure;

in response to the number of concurrent active calls exceeding a predefined threshold, generating the new flooding group; and determining a capacity limit of the new flooding group based on the number of concurrent active calls at the time of the call failure.

13. The method of claim 11, wherein the second phone number includes a main number and an extension number, and determining the new flooding group number includes using the main number as the new flooding group number.

14. The method of claim 11, wherein determining the new flooding group number comprises:

determining a time of the call failure;

determining a first number of concurrent active calls for a first set of phone numbers at the time of the call failure, each phone number in the first set of phone numbers having initial digits identical to the second phone number excluding last three digits;

determining a second number of concurrent active calls for a second set of phone numbers at the time of the call failure, each phone number in the second set of phone numbers having initial digits identical to the second phone number excluding last four digits;

determining a third number of concurrent active calls for a third set of phone numbers at the time of the call failure, each phone number in the third set of phone numbers having initial digits identical to the second phone number excluding last five digits; and determining the new flooding group number based on the first, second and third number of concurrent active calls.

15. A tangible, non-transitory computer-readable medium containing instructions which, when executed, cause a computing device to perform operations comprising:

receiving, from a telephone dialing system, an indication indicating that a call to a phone number has successfully ended;

in response to the indication indicating that the call to the phone number has successfully ended, determining that a set of initial digits of the phone number matches a flooding group number of a flooding group, wherein the flooding group includes a plurality of phone numbers, the set of initial digits of each of the plurality of phone numbers has values identical to the flooding group number, the plurality of phone numbers includes the phone number, and the flooding group has a capacity limit;

determining that a maximum number of concurrent active calls for the flooding group during a predefined period of time is within a predetermined threshold from the capacity limit of the flooding group and determining that no failed calls have occurred for the flooding group during the predefined period of time; and in response to determining that the maximum number of concurrent active calls for the flooding group during the predefined period of time is within the predetermined threshold from the capacity limit of the flooding group and in response to determining that no failed calls have occurred for the flooding group during the predefined period of time, increasing the capacity limit of the flooding group.

16. The tangible, non-transitory computer-readable medium of claim 15, wherein the operations further comprise:

receiving a second phone number to dial;

determining that the set of initial digits of the second phone number matches the flooding group number of the flooding group;

determining a number of concurrent current active calls for the flooding group;

in response to the number of concurrent current active calls for the flooding group below the capacity limit of the flooding group, transmitting the second phone number to the telephone dialing system;

after transmitting the second phone number, receiving, from the telephone dialing system, an indication indicating a call failure to the second phone number; and in response to receiving the indication indicating the call failure to the second phone number, decreasing the capacity limit of the flooding group.

17. The tangible, non-transitory computer-readable medium of claim 15, wherein the operations further comprise:

receiving a second phone number to dial;

determining that the set of initial digits of the second phone number matches the flooding group number of the flooding group;

determining a number of concurrent current active calls for the flooding group; and in response to the number of concurrent current active calls for the flooding group exceeding the capacity limit of the flooding group, storing the second phone number in a queue.

18. The tangible, non-transitory computer-readable medium of claim 15, wherein the operations further comprise:

receiving, from the telephone dialing system, an indication indicating a call failure to a second phone number;

in response to the call failure, determining that initial digits of the second phone number do not match any flooding group number;

determining a new flooding group number based on initial digits of the second phone number;

determining a set of phone numbers including the second phone number, each phone number in the set of phone numbers having initial digits identical to the new flooding group number; and generating a new flooding group, the new flooding group including the set of phone numbers and associated with the new flooding group number.

19. The tangible, non-transitory computer-readable medium of claim 18, wherein generating the new flooding group comprises:

determining a time of the call failure and a number of concurrent active calls for the set of phone numbers at the time of the call failure;

in response to the number of concurrent active calls exceeding a predefined threshold, generating the new flooding group; and determining a capacity limit of the new flooding group based on the number of concurrent active calls at the time of the call failure.

20. The tangible, non-transitory computer-readable medium of claim 18, wherein the second phone number includes a main number and an extension number, and determining the new flooding group number includes using the main number as the new flooding group number.

\* \* \* \* \*